(12) United States Patent
Soyama

(10) Patent No.: US 10,351,461 B2
(45) Date of Patent: Jul. 16, 2019

(54) METHOD FOR DIVIDING BRITTLE SUBSTRATE

(71) Applicant: Mitsuboshi Diamond Industrial Co., Ltd., Settsu, Osaka (JP)

(72) Inventor: Hiroshi Soyama, Settsu (JP)

(73) Assignee: MITSUBOSHI DIAMOND INDUSTRIAL CO., LTD. (JP)

( * ) Notice: Subject to any disclaimer, the term of this patent is extended or adjusted under 35 U.S.C. 154(b) by 0 days.

(21) Appl. No.: 15/312,686

(22) PCT Filed: Mar. 31, 2015

(86) PCT No.: PCT/JP2015/060199
§ 371 (c)(1),
(2) Date: Nov. 21, 2016

(87) PCT Pub. No.: WO2015/182241
PCT Pub. Date: Dec. 3, 2015

(65) Prior Publication Data
US 2017/0183250 A1   Jun. 29, 2017

(30) Foreign Application Priority Data

May 30, 2014 (JP) .................................. 2014-112376

(51) Int. Cl.
*C03B 33/033* (2006.01)
*C03B 33/037* (2006.01)
(Continued)

(52) U.S. Cl.
CPC ............ *C03B 33/033* (2013.01); *B28D 1/225* (2013.01); *B28D 5/00* (2013.01); *B28D 5/0011* (2013.01);
(Continued)

(58) Field of Classification Search
CPC . C03B 33/033; C03B 33/023; Y10T 225/325; Y10T 225/12; B28D 1/225
(Continued)

(56) References Cited

U.S. PATENT DOCUMENTS 3,865,673 A  *  2/1975  DeTorre ................ C03B 33/033
                                                              428/43
2004/0155085 A1* 8/2004  Takamatsu ............. B28D 1/225
                                                              225/2
(Continued)

FOREIGN PATENT DOCUMENTS

| CN | 1496339 A | 5/2004 |
| CN | 1741879 A | 3/2006 |

(Continued)

OTHER PUBLICATIONS

International Search Report dated May 19, 2015 in corresponding PCT International Application No. PCT/JP2015/060199.
(Continued)

*Primary Examiner* — Laura M Lee
(74) *Attorney, Agent, or Firm* — Ostrolenk Faber LLP

(57) ABSTRACT

A cutter edge is caused to slide to generate a plastic deformation on a first surface of a brittle substrate, thus forming a trench line. The trench line is formed so as to obtain a crack-free state in which the brittle substrate seamlessly continues in a direction intersecting the trench line directly below the trench line. The crack-free state is then maintained. A crack of the brittle substrate in its thickness direction is extended along the trench line to form a crack line. The brittle substrate is divided along the crack line.

7 Claims, 18 Drawing Sheets

(51) Int. Cl.
*B28D 5/00* (2006.01)
*B28D 1/22* (2006.01)
*C03B 33/023* (2006.01)

(52) U.S. Cl.
CPC .......... *C03B 33/023* (2013.01); *C03B 33/037* (2013.01); *Y10T 225/12* (2015.04); *Y10T 225/325* (2015.04)

(58) Field of Classification Search
USPC .................................. 83/867–887; 225/96.5
See application file for complete search history.

(56) References Cited

U.S. PATENT DOCUMENTS

| | | | | |
|---|---|---|---|---|
| 2004/0245913 | A1 | 12/2004 | Wakayama | 313/493 |
| 2006/0126200 | A1 | 6/2006 | Nishio | 359/900 |
| 2009/0126551 | A1 | 5/2009 | Takamatsu et al. | 83/886 |
| 2009/0179060 | A1 | 7/2009 | Takamatsu et al. | 225/2 |
| 2009/0230102 | A1* | 9/2009 | Soyama | B28D 1/221 219/121.69 |
| 2010/0320179 | A1* | 12/2010 | Morita | B28D 5/0011 219/121.69 |
| 2011/0226832 | A1 | 9/2011 | Bayne et al. | 225/2 |
| 2015/0107572 | A1* | 4/2015 | Fujita | B24D 5/12 125/15 |

FOREIGN PATENT DOCUMENTS

| | | | | |
|---|---|---|---|---|
| CN | 101610870 A | 12/2009 | | |
| EP | 2199007 A1 | 6/2010 | | |
| EP | 2481543 A1 | 8/2012 | | |
| JP | 2007-331983 | 12/2007 | | |
| JP | 2008-201629 | 9/2008 | | |
| JP | 2012-000793 | 1/2012 | | |
| JP | WO 2013161849 A1 * | 10/2013 | ............... | B24D 5/12 |
| KR | 10-0549099 B1 | 2/2006 | | |
| KR | 10-2011-0136713 A | 12/2011 | | |
| KR | 10-2012-0134000 A | 12/2012 | | |
| WO | WO 02/104078 A1 | 12/2002 | | |
| WO | WO 03/006391 A1 | 1/2003 | | |

OTHER PUBLICATIONS

Chinese Office Action dated Jun. 4, 2018 and its English translation of the Chinese Office Action based on the Japanese translation attached. Portions relevant to prior-art rejections are translated.
Extended European Search Report dated Jan. 31, 2018 in corresponding EP Application No. 15799770.1.
Korean Office Action dated Nov. 30, 2017 with English language translation of the Office based on the Japanese translation (attached). Portions relevant to prior-art based rejections are translated.
Office Action dated Jan. 25, 2019 in counterpart Chinese Patent Application No. 2015800281991 with Japanese translation and English translation based on the Japanese translation. Portions relevant to prior-art based rejections are translated.

* cited by examiner

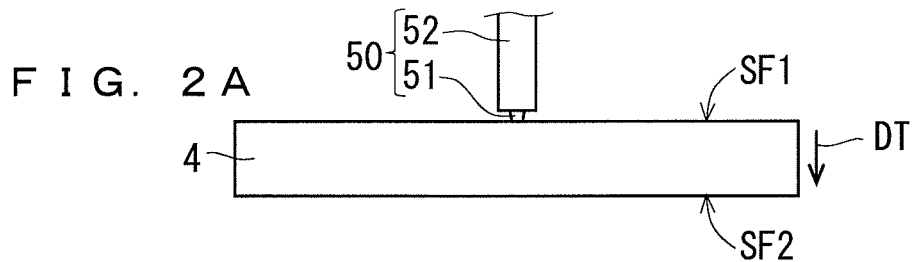
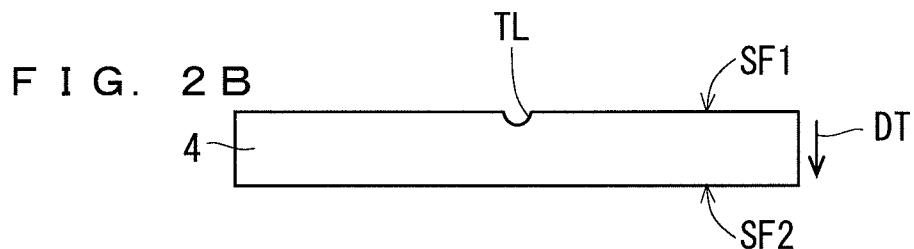
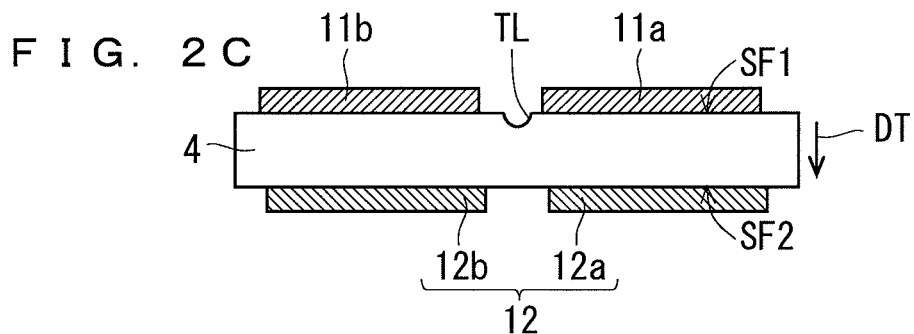
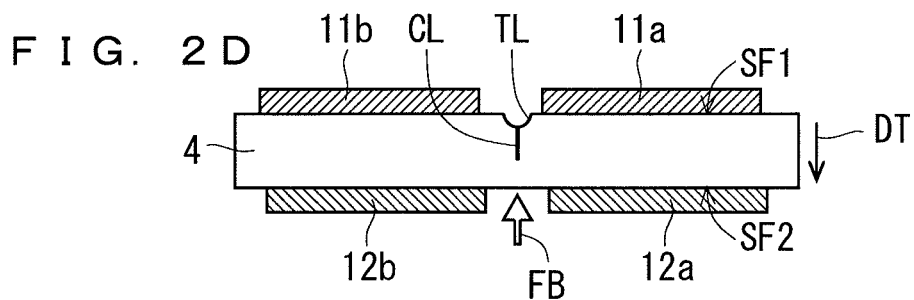
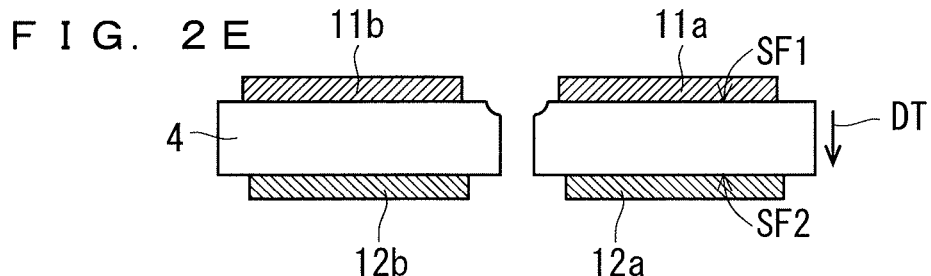

F I G . 4
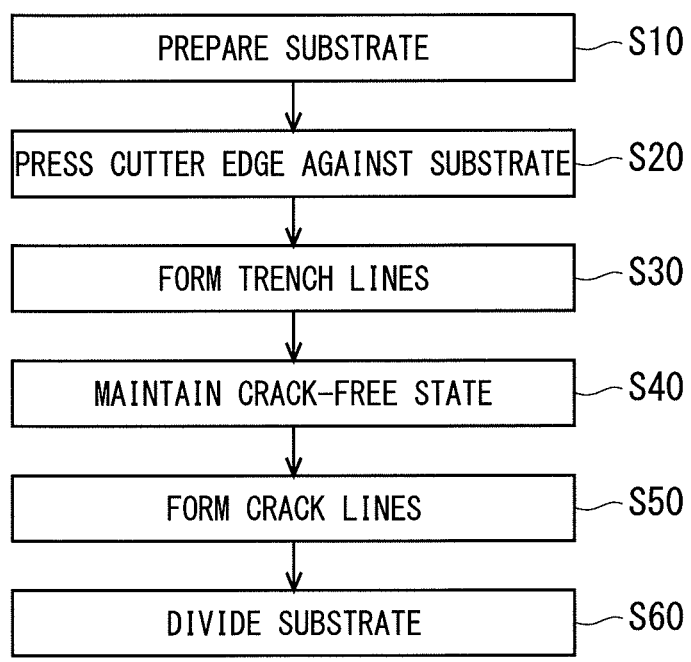

F I G . 8
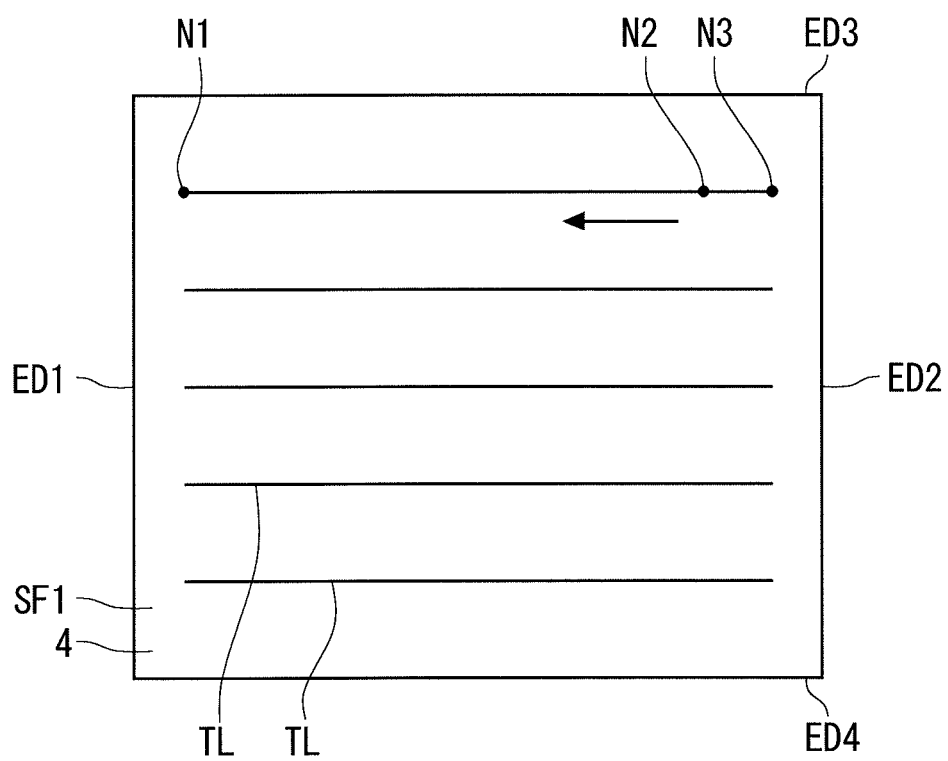

F I G . 9
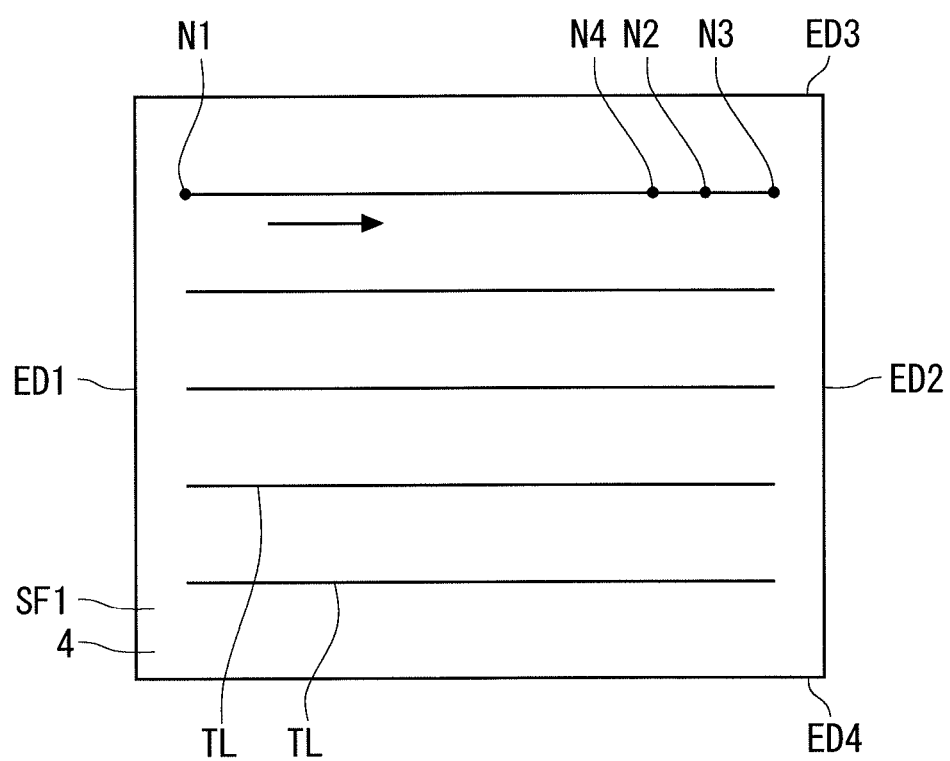

F I G . 1 2
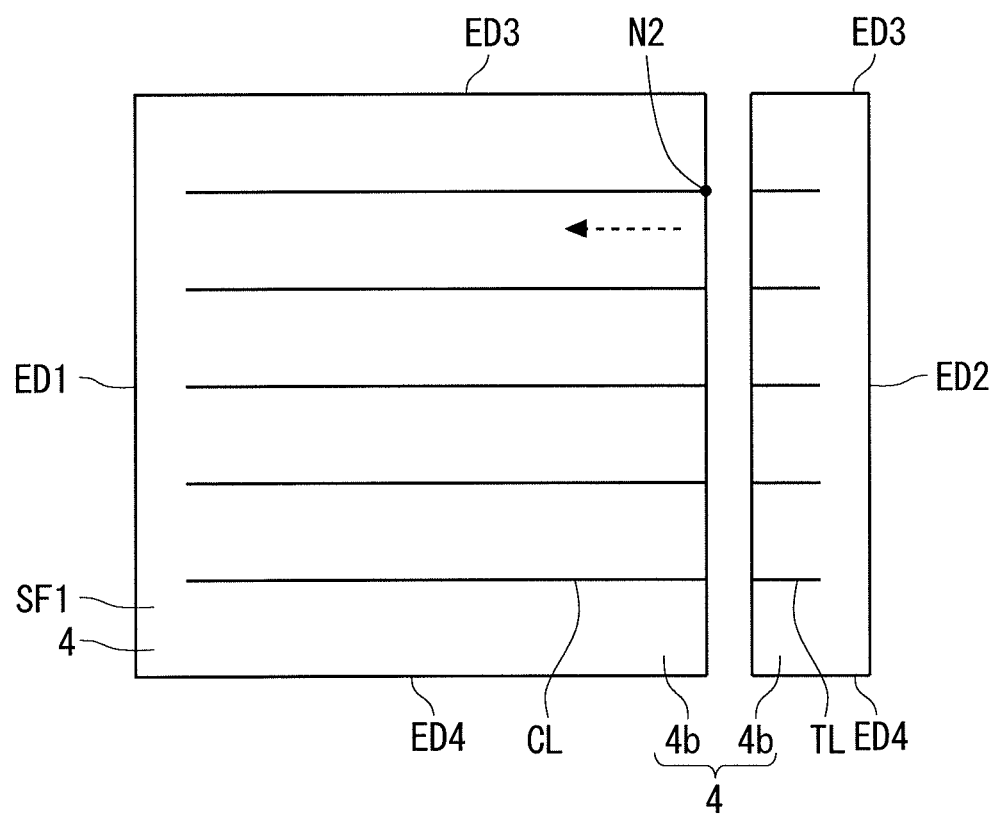

F I G . 1 4
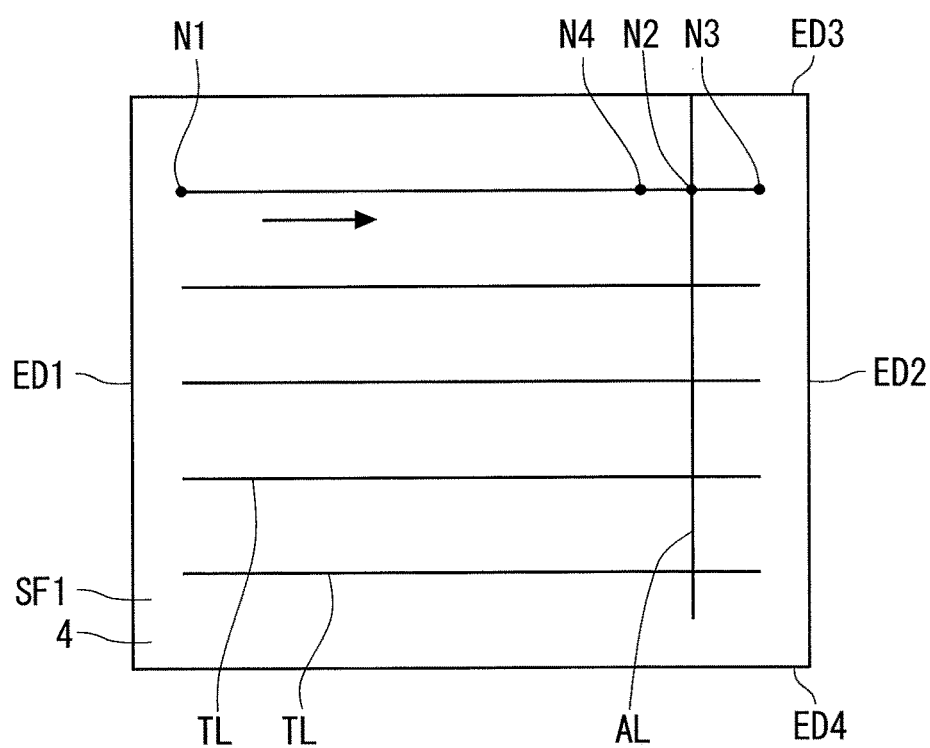

METHOD FOR DIVIDING BRITTLE SUBSTRATE

CROSS-REFERENCE TO RELATED APPLICATIONS

The present application is a 35 U.S.C. §§ 371 national phase conversion of PCT/JP2015/060199, filed Mar. 31, 2015, which claims priority to Japanese Patent Application No. 2014-112376, filed May 30, 2014, the contents of which are incorporated herein by reference. The PCT International Application was published in the Japanese language.

TECHNICAL FIELD

The present invention relates to a method for dividing a brittle substrate.

BACKGROUND ART

The manufacture of electrical equipment such as a flat display panel or a solar panel often needs dividing of a brittle substrate such as a glass substrate. A scribe line is first formed on a substrate, and the substrate is then divided along the scribe line. The scribe line can be formed by mechanically processing the substrate with a cutter. The cutter slides or rolls on the substrate, thus forming a trench on the substrate through a plastic deformation and forming a vertical crack directly below the trench. Subsequently, a stress is applied to the substrate in a step referred to as a breaking step. The crack fully penetrates in the thickness direction in the breaking step, so that the substrate is divided.

The step of dividing the substrate is often performed immediately after the step of forming a scribe line in the substrate. Alternatively, it is proposed to perform the step of processing the substrate between the step of forming a scribe line and the breaking step. The step of processing the substrate is, for example, the step of providing a member on the substrate.

According to the technique of WO 2002/104078, for example, a scribe line is formed on a glass substrate per area that serves as an organic EL display before mounting a sealing cap onto the substrate in the method for manufacturing an organic EL display. This method avoids the contact between the sealing cap and the glass cutter that might occur if the scribe line were formed on the glass substrate after providing the glass substrate with the sealing cap.

According to the technique of WO 2003/006391, for example, two glass substrates are bonded to each other after the formation of scribe lines thereon in the method for manufacturing a liquid crystal display panel. This method breaks two brittle substrates simultaneously in a single breaking step.

PRIOR ART DOCUMENTS

Patent Documents

Patent Document 1: WO 2002/104078
Patent Document 2: WO 2003/006391

SUMMARY OF INVENTION

Problems to be Solved by the Invention

According to the conventional techniques, the brittle substrate is processed after the formation of a scribe line, and then, the breaking step is performed through application of a stress. This means that a vertical crack has been formed in the processing of the brittle substrate. If the vertical crack penetrates further in the thickness direction unintentionally during the process, the brittle substrate that should be a single body during the process may be separated. Also in the case where the step of processing a substrate is not performed between the step of forming a scribe line and the step of breaking a substrate, the substrate normally needs to be transported or stored after the step of forming a scribe line and before the step of breaking a substrate. While being transported or stored, the substrate may be divided unintentionally.

The present invention has been made to solve such problems and has an object to provide a method for dividing a brittle substrate. The method prevents a brittle substrate from being divided unintentionally before a time when the substrate should be divided, while preliminarily defining a position at which the brittle substrate is divided.

Means to Solve the Problems

A method for dividing a brittle substrate according to the present invention includes preparing a brittle substrate including a first surface and having a thickness direction perpendicular to the first surface, pressing a cutter edge against the first surface of the brittle substrate, and forming a trench line having a groove shape by causing the cutter edge pressed in the pressing to slide on the first surface of the brittle substrate to generate a plastic deformation on the first surface of the brittle substrate. The forming a trench line is performed to obtain a crack-free state in which the brittle substrate seamlessly continues in a direction intersecting the trench line directly below the trench line. The method for dividing a brittle substrate according to the present invention further includes maintaining the crack-free state after the forming a trench line, and after the maintaining the crack-free state, forming a crack line by extending a crack of the brittle substrate in the thickness direction along the trench line. The crack line breaks seamless continuity of the brittle substrate in the direction intersecting the trench line directly below the trench line. The method for dividing a brittle substrate according to the present invention further includes dividing the brittle substrate along the crack line.

"Pressing a cutter edge against the first surface" above means that the cutter edge is pressed against an appropriate position of the first surface, and thus, can also mean that the cutter edge is pressed against the perimeter of the first surface.

Effects of the Invention

According to the present invention, a trench line with no crack located directly therebelow is formed as a line that defines a position at which the brittle substrate is divided. The crack line to be used as a direct trigger to divide the substrate is formed by extending a crack along the trench line that has been formed. As a result, the brittle substrate after the formation of the trench line and before the formation of the crack line is not easily divided because the crack line has yet to be formed, though the position at which the substrate is divided has been defined. The use of such a state prevents the brittle substrate from being divided unintentionally before a time when the brittle substrate should be divided, while preliminarily defining the position at which the brittle substrate is divided.

BRIEF DESCRIPTION OF DRAWINGS

FIG. 2A is a schematic end view taken along a line IIA-IIA of FIG. 1A, FIG. 2B is a schematic end view taken along a line IIB-IIB of FIG. 1B, FIG. 2C is a schematic end view taken along a line IIC-IIC of FIG. 1C, FIG. 2D is a schematic end view taken along a line IID-IID of FIG. 1D, and FIG. 2E is a schematic end view taken along a line IIE-IIE of FIG. 1E.

FIG. 4 is a flowchart schematically illustrating steps of the method for dividing a brittle substrate in the first embodiment of the present invention.

FIG. 8 is a top view schematically illustrating a method for dividing a brittle substrate in a second modification of the second embodiment of the present invention.

FIG. 9 is a top view schematically illustrating a method for dividing a brittle substrate in a third modification of the second embodiment of the present invention.

FIG. 12 is a top view schematically illustrating a third step of the method for dividing a brittle substrate in the third embodiment of the present invention.

FIG. 14 is a top view schematically illustrating a method for dividing a brittle substrate in a second modification of the third embodiment of the present invention.

DESCRIPTION OF EMBODIMENTS

Figure 1A:
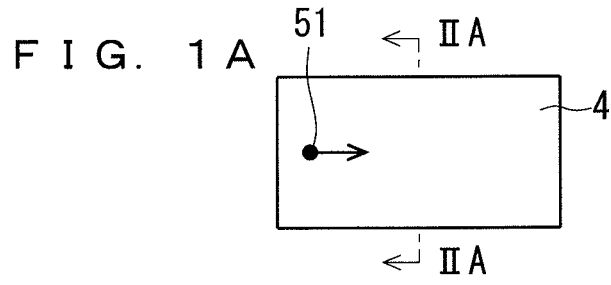
FIGS. 1A, 1B, 1C, 1D, and 1E are top views schematically illustrating a method for dividing a brittle substrate in a first embodiment of the present invention.

Embodiments of the present invention will be described below with reference to the drawings. The same or corresponding portions are denoted by the same references in the drawings, and description thereof will not be repeated.

First Embodiment

A method for dividing a brittle substrate of the present embodiment will be described below.

With reference to FIGS. 1A and 2A, a glass substrate 4 (brittle substrate) is first prepared (FIG. 4: step S10). The glass substrate 4 has an upper surface SF1 (first surface) and a lower surface SF2 opposite thereto. The glass substrate 4 has a thickness direction DT perpendicular to the upper surface SF1. Also prepared is a cutting tool 50 including a cutter edge 51 and a shank 52. The cutter edge 51 is fixed to and held by the shank 52 that serves as a holder.

The cutter edge 51 is then pressed against the upper surface SF1 of the glass substrate 4 (FIG. 4: step S20). The pressed cutter edge 51 is then caused to slide on the upper surface SF1 of the glass substrate 4 (see an arrow of FIG. 1A).

Figure 1B:
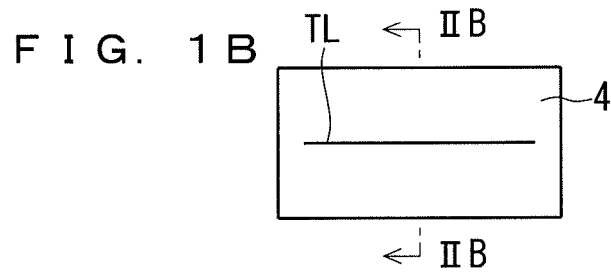
Figure 3A:
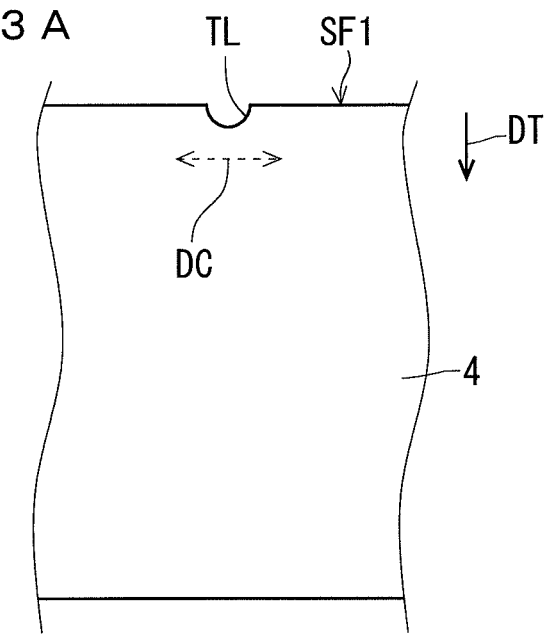
FIG. 3A is an end view schematically illustrating a configuration of a trench line formed in the method for dividing a brittle substrate in the first embodiment of the present invention.

With reference to FIGS. 1B and 2B, the sliding of the cutter edge 51 causes a plastic deformation on the upper surface SF1 of the glass substrate 4. Consequently, a groove-shaped trench line TL is formed on the upper surface SF1 (FIG. 4: step S30). With reference to FIG. 3A, the step of forming a trench line TL is performed to obtain a crack-free state in which the glass substrate 4 seamlessly continues in a direction DC intersecting a direction in which the trench line TL extends (a lateral direction in FIG. 1B) directly below the trench line TL. In the crack-free state, although the trench line TL is formed through the plastic deformation, no crack is formed along the trench line TL. Even when an external force that produces, for example, a bending moment is merely applied to the glass substrate 4 as in the conventional breaking step, accordingly, the glass substrate 4 is not easily divided along the trench line TL. The step of dividing the glass substrate 4 along the trench line TL is thus not performed in the crack-free state. The load to be applied to the cutter edge 51 for a crack-free state is set to be small so as to cause no crack and large so as to cause a plastic deformation.

The crack-free state is maintained over a required time (FIG. 4: step S40). To maintain the crack-free state, the following operation may be avoided: an operation of excessively applying a stress to the glass substrate 4 at the trench line TL, for example, an application of such a large external stress as to cause a breakage in the substrate or heating accompanied with a large temperature change. The glass substrate 4 can be transported to a site of the next step, with the crack-free state maintained. The glass substrate 4 can be stored until the next step, with the crack-free state maintained.

Figure 1C:
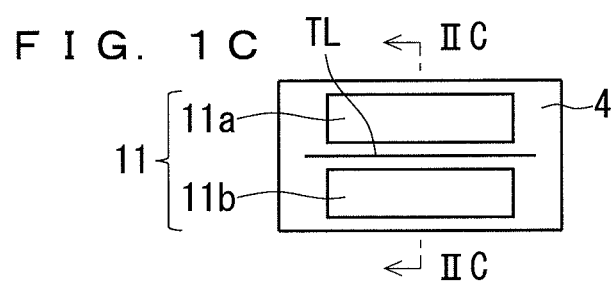

With reference to FIGS. 1C and 2C, the glass substrate 4 is then processed with the crack-free state maintained. Specifically, a member 11 is provided on the upper surface SF1. The member 11 may include portions 11a and 11b (first and second portions) separate from each other. The portions 11a and 11b may be each apart from the trench line TL. The portions 11a and 11b may sandwich the trench line TL therebetween. A member 12 is provided on the lower surface SF2. The member 12 may include portions 12a and 12b separate from each other. The step of providing a member can be performed, for example, by bonding a member prepared in advance or depositing a material.

Figure 1D:
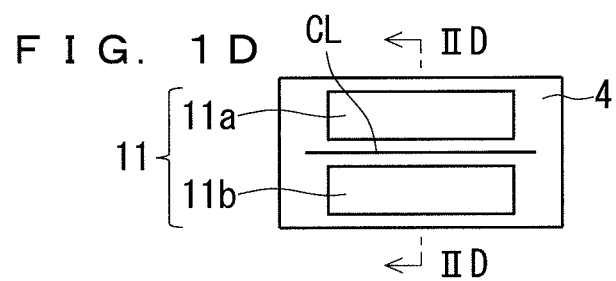
Figure 3B:
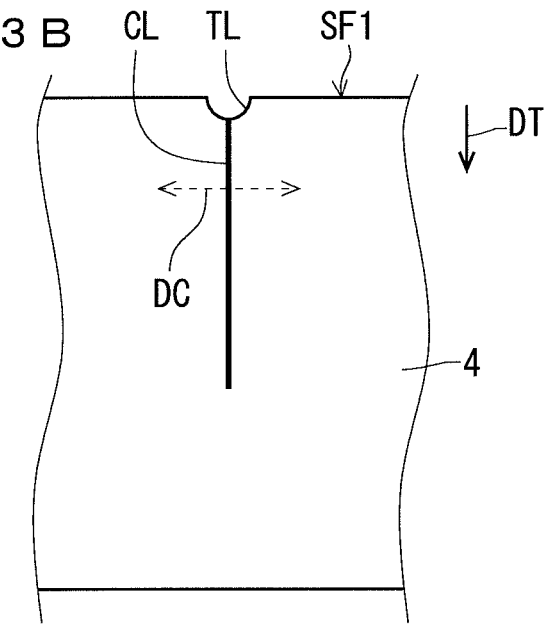
FIG. 3B is an end view schematically illustrating a configuration of a crack line.

With reference to FIGS. 1D and 2D, after the crack-free state is maintained as described above, in other words, after a time lapse from the formation of the trench line TL, a crack of the glass substrate 4 in the thickness direction DT is extended along the trench line TL. Consequently, a crack line CL is formed in a self-aligned manner relative to the trench line TL (FIG. 4: step S50). With reference to FIG. 3B, the crack line CL breaks the seamlessness continuity of the glass substrate 4 in the direction DC intersecting the direction in which the trench line TL extends (the lateral direction in FIG. 1B) directly below the trench line TL. In other words, "seamless continuity" refers to the continuity that is not interrupted by a crack herein. In the state in which the seamless continuity is broken as described above, the portions of the glass substrate 4 may be in contact with each other with the crack of the crack line CL therebetween.

The formation of the crack line CL starts, for example, by applying such a force as to release a distortion of an internal stress in the vicinity of the trench line TL to the glass substrate 4 at a predetermined location on the trench line TL. A stress can be applied by, for example, application of an external stress caused by pressing the cutter edge against the formed trench line TL again or by heating through irradiation with laser light or the like.

Figure 1E:
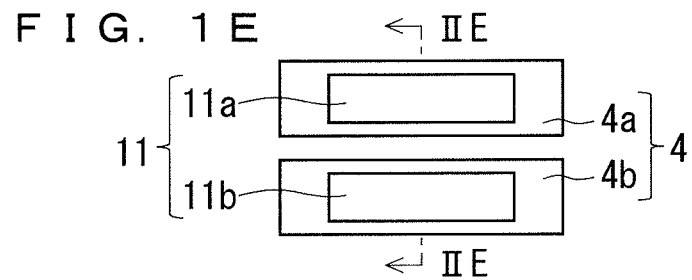

Further with reference to FIGS. 1E and 2E, the glass substrate 4 is then divided into substrate pieces 4a and 4b along the crack line CL (FIG. 4: step S60). In other words, a so-called breaking step is performed. The breaking step can be performed by application of an external force FB (FIG. 2D) to the glass substrate 4. This results in the substrate piece 4a provided with the portions 11a and 12a and the substrate piece 4b provided with the portions 11b and 12b.

Although the members 11 and 12 are respectively provided on the upper surface SF1 and the lower surface SF2 in FIGS. 1C and 2C, a member may be provided on only one of the upper surface SF1 and the lower surface SF2. The member does not always need to include a plurality of portions. Processing of the glass substrate 4 is not limited to the step of providing a member. The glass substrate 4 does not always need to be processed while the crack-free state is maintained, and the glass substrate 4 may be merely transported and stored.

According to the present embodiment, the trench line TL (FIG. 3A) with no crack located directly therebelow is formed as a line defining a position at which the glass substrate 4 is divided. The crack line CL (FIG. 3B) to be used as a direct trigger for dividing is formed by extending a crack in a self-aligned manner along the trench line TL that has been formed. Consequently, the glass substrate 4 (FIGS. 1B and 2B) after the formation of the trench line TL and before the formation of the crack line CL is not easily divided because the crack line CL has yet to be formed, though the position at which the glass substrate 4 is divided has been defined by the trench line TL. The glass substrate 4 in such a state can be prevented from being divided unintentionally before a time at which the glass substrate 4 should be divided, with a position at which the glass substrate 4 is divided preliminarily defined. For example, the glass substrate 4 can be prevented from being divided unintentionally during its transportation. Also, the glass substrate 4 can be prevented from being divided unintentionally during processing for providing the members 11 and 12.

The step of forming a crack line CL in the present embodiment essentially differs from a so-called breaking step. The breaking step is performed for extending the formed crack further in the thickness direction to separate the substrate completely. On the other hand, the step of forming a crack line CL brings about a change from the crack-free state obtained through the formation of the trench line TL to a crack-provided state. Such a change is conceivably caused by a release of an internal stress produced in the crack-free state. The states of a plastic deformation in the formation of the trench line TL and the magnitude and directivity of an internal stress, produced by the formation of a trench line TL, conceivably differ between the cases where rolling of a rotary blade is used and where sliding of a cutter edge is used as in the present embodiment. In the case where sliding of a cutter edge is used, a crack is likely to appear in more varied scribe conditions. The release of an internal stress needs some kind of trigger. It is conceivable that the generation of a crack on the trench line TL, which is caused by application of an external stress as described above, will act as such a trigger. A preferable method for forming a trench line TL and a crack line CL will be described in detail in second to sixth embodiments below.

Second Embodiment

Description will now be given of a cutter edge used in a method for dividing a brittle substrate in the present embodiment.

Figure 5A:
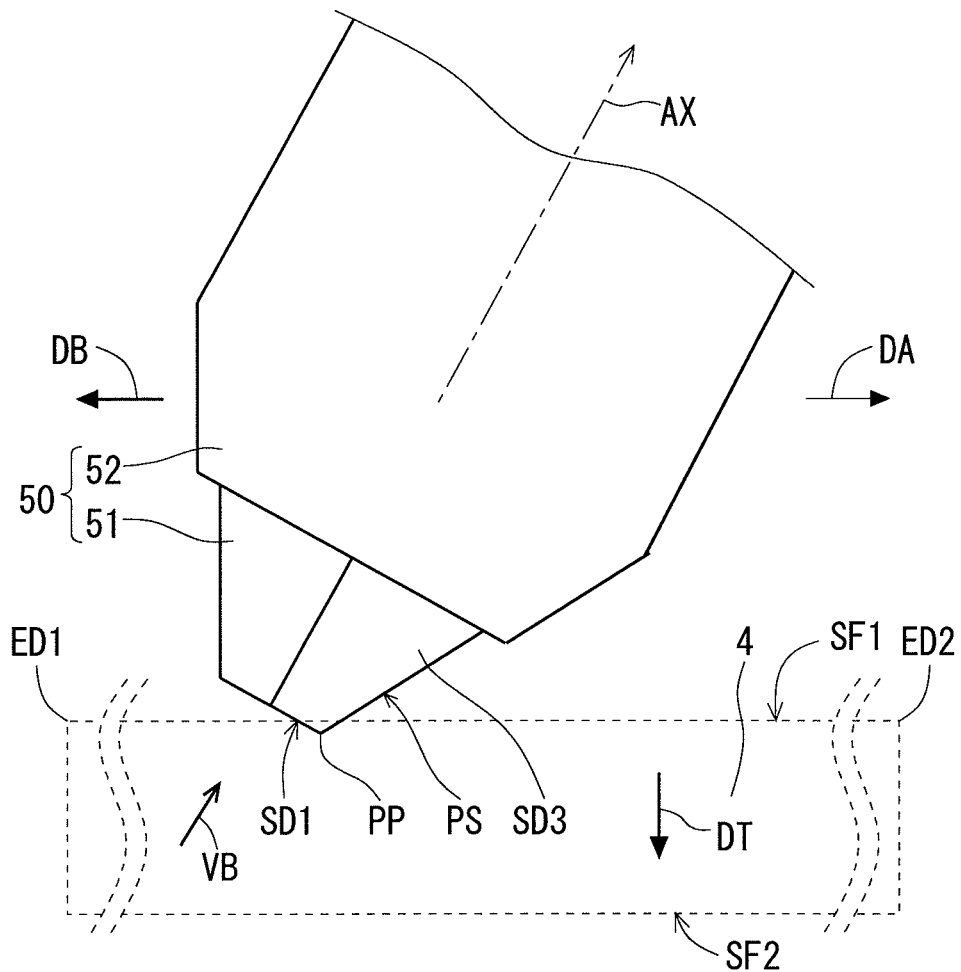
FIG. 5A is a side view schematically illustrating a configuration of a tool used in a method for dividing a brittle substrate in a second embodiment of the present invention.
Figure 5B:
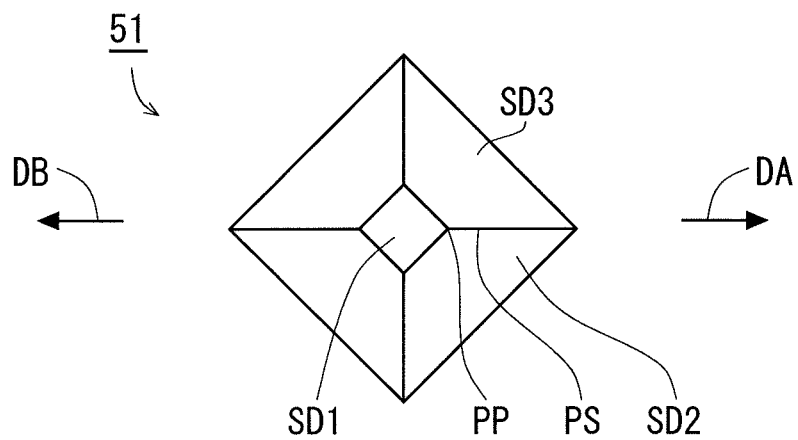
FIG. 5B is a plan view schematically illustrating a configuration of a cutter edge of the tool, which is seen from an arrow VB of FIG. 5A.

With reference to FIGS. 5A and 5B, the cutter edge 51 includes a top surface SD1 (first surface) and a plurality of surfaces surrounding the top surface SDI. The plurality of surfaces include a side surface SD2 (second surface) and a side surface SD3 (third surface). The top surface SD1 and the side surfaces SD2 and SD3 (the first to third surfaces) are oriented in different directions and are adjacent to each other. The cutter edge 51 has a vertex at which the top surface SD1 and the side surfaces SD2 and SD3 meet, and the vertex forms a protruding portion PP of the cutter edge 51. The side surfaces SD2 and SD3 form a ridge forming a side portion PS of the cutter edge 51. The side portion PS linearly extends from the protruding portion PP. The side portion PS, which is a ridge as described above, extends linearly.

It is preferable that the cutter edge 51 be a diamond point. Specifically, the cutter edge 51 is desirably made of diamond in terms of hardness and reduced surface roughness. More preferably, the cutter edge 51 is made of single-crystal diamond. Still more desirably, in crystallography, the top surface SD1 is a {001} plane, and each of the side surfaces SD2 and SD3 is a {111} plane. In this case, the side surfaces SD2 and SD3 are crystal planes equivalent to each other in crystallography though they have different directions.

A diamond other than single-crystal diamond may be used, and for example, a polycrystalline diamond synthesized by chemical vapor deposition (CVD) may be used. Alternatively, sintered diamond may be used that is obtained by binding, with a binder such as iron group elements, polycrystalline diamond particles sintered from particulate graphite or non-graphitic carbon so as not to contain the binder such as iron group elements.

The shank 52 extends along an axial direction AX. The cutter edge 51 is preferably attached to the shank 52 in such a manner that the direction normal to the top surface SD1 extends substantially along the axial direction AX.

To form a trench line TL (FIG. 3A) with the cutting tool 50, the protruding portion PP and the side portion PS of the cutter edge 51 are pressed against the upper surface SF1 of the glass substrate 4 in the thickness direction DT of the glass substrate 4. Then, substantially along the direction in which the side portion PS is projected onto the upper surface SF1, the cutter edge 51 is caused to slide on the upper surface SF1. This forms a groove-shaped trench line TL involving no vertical crack on the upper surface SF1. The trench line TL is generated as a result of a plastic deformation of the glass substrate 4, although the glass substrate 4 may become slightly chipped then. Such chipping, however, can cause minute fragments, and is accordingly desired to be as little as possible.

The sliding of the cutter edge 51 forms a trench line TL and a crack line CL (FIG. 3B) simultaneously in one case and forms a trench line TL alone in the other case. The crack line CL is a crack extending from a dent of the trench line TL in the thickness direction DT and extends linearly in the upper surface SF. The method described below can form a trench line TL alone, and then, form a crack line CL along the trench line TL.

A method for dividing the glass substrate 4 will now be described below.

Figure 6A:
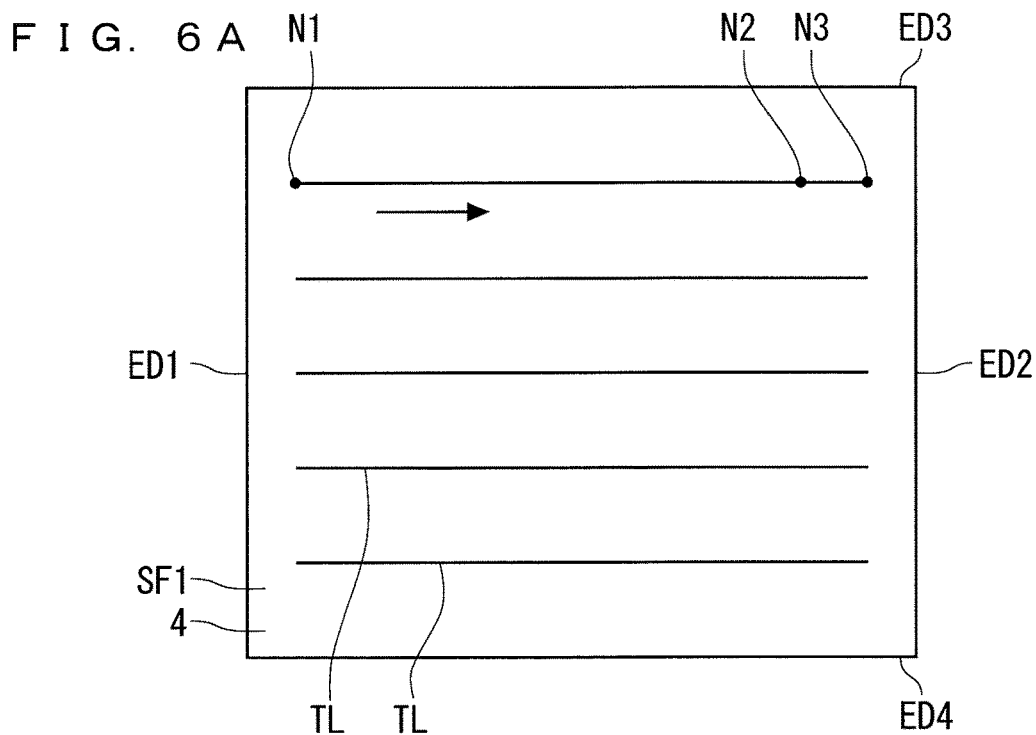
FIGS. 6A and 6B are top views schematically illustrating the method for dividing a brittle substrate in the second embodiment of the present invention.

With reference to FIG. 6A, the glass substrate 4 is first prepared in step S10 (FIG. 4). The glass substrate 4 has the flat upper surface SF1. The perimeter surrounding the upper surface SF1 includes an edge ED1 (first edge) and an edge ED2 (second edge) opposite to each other. The perimeter has a rectangular shape in the example illustrated in FIG. 6A. The edges ED1 and ED2 are accordingly parallel to each other. The edges ED1 and ED2 are short sides of a rectangle in the example illustrated in FIG. 6A. The glass substrate 4 has the thickness direction DT (FIG. 5A) perpendicular to the upper surface SF1.

In step S20 (FIG. 4), the cutter edge 51 is then pressed against the upper surface SF1 at a position N1. The position N1 will be described below in detail. With reference to FIG. 5A, the cutter edge 51 is pressed such that, on the upper surface SF1 of the glass substrate 4, the protruding portion PP of the cutter edge 51 is positioned between the edge ED1 and the side portion PS and the side portion PS of the cutter edge 51 is positioned between the protruding portion PP and the edge ED2.

In step S30 (FIG. 4), a plurality of trench lines TL (in the figure, five lines) are then formed on the upper surface SF1. The trench line TL is formed between the position N1 (first position) and a position N3 (third position). A position N2 (second position) is located between the positions N1 and N3. The trench line TL is accordingly formed between the positions N1 and N2 and between the positions N2 and N3.

The positions N1 and N3 may be apart from the perimeter of the upper surface SF1 of the glass substrate 4 as illustrated in FIG. 6A, or one or both of the positions N1 and N3 may be positioned on the perimeter of the upper surface SF1. The trench line TL to be formed is apart from the perimeter of the glass substrate 4 in the former case and is in contact with the perimeter of the glass substrate 4 in the latter case.

The position N1 of the positions N1 and N2 is closer to the edge ED1, and the position N2 of the positions N1 and N2 is closer to the edge ED2. In the example illustrated in FIG. 6A, the position N1 is closer to the edge ED1 of the edges ED1 and ED2, and the position N2 is closer to the edge ED2 of the edges ED1 and ED2. Alternatively, both of the positions N1 and N2 may be closer to any one of the edges ED1 and ED2.

In the formation of the trench line TL, the cutter edge 51 is displaced from the position N1 to the position N2 and is further displaced from the position N2 to the position N3 in the present embodiment. With reference to FIG. 5A, the cutter edge 51 is displaced in a direction DA that is a direction from the edge ED1 to the edge ED2. The direction DA corresponds to the direction in which an axis AX extending from the cutter edge 51 is projected onto the upper surface SF1. In this case, the cutter edge 51 is dragged on the upper surface SF1 by the shank 52.

In step S40 (FIG. 4), the crack-free state (FIG. 3A) described in the first embodiment is then maintained over a predetermined time. During that time, the glass substrate 4 may be transported or the glass substrate 4 may be processed as in the first embodiment. The processing of the glass substrate 4 may be the step of providing a member on the glass substrate 4 as in the first embodiment.

Figure 6B:
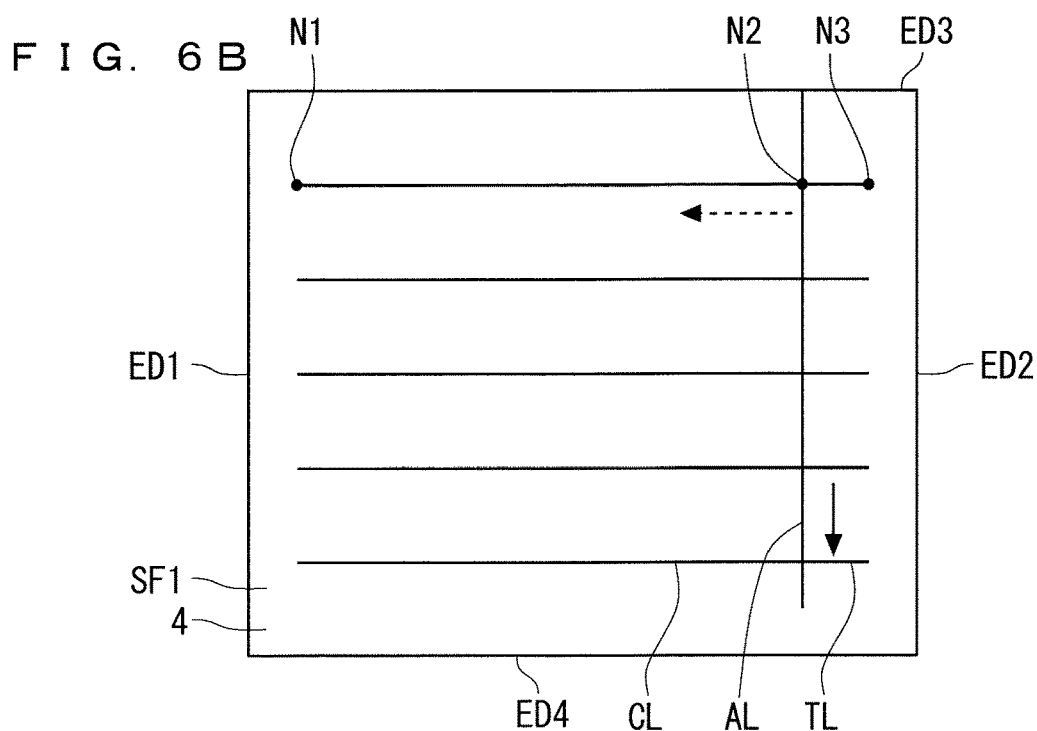

With reference to FIG. 6B, after the formation of the trench lines TL, in step S50 (FIG. 4), cracks of the glass substrate 4 in the thickness direction DT (FIG. 3B) are extended along the trench lines TL from the position N2 to the position N1 (see a dashed arrow in the figure) to form crack lines CL. The formation of the crack lines CL starts by an assist line AL and the trench lines TL intersecting at the position N2. For this purpose, the assist line AL is formed after the formation of the trench lines TL. The assist line AL is a typical scribe line associated with a crack in the thickness direction DT and releases a distortion of an internal stress in the vicinity of the trench line TL. The assist line AL can be formed by any method, and as illustrated in FIG. 6B, may be formed with the perimeter of the upper surface SF being a starting point.

The crack lines CL are less likely to be formed in the direction from the position N2 to the position N3 than in the direction from the position N2 to the position N1. In other words, ease of extension of the crack lines CL involves direction dependency. This can result in a phenomenon in which the crack lines CL are formed between the positions N1 and N2 and are not formed between the positions N2 and N3. The present embodiment is aimed at dividing the glass substrate 4 along between the positions N1 and N2 and is not aimed at separating the glass substrate 4 along between the positions N2 and N3. Thus, while the formation of the crack line CL is necessary between the positions N1 and N2, difficulty of forming the crack line CL between the positions N2 and N3 is not an issue.

In step S60 (FIG. 4), the glass substrate 4 is then divided along the crack lines CL. Specifically, a breaking step is performed. In the case where the crack line CL fully penetrates in the thickness direction DT in its formation, forming of the crack lines CL and dividing of the glass substrate 4 occur simultaneously. In this case, the breaking step can be omitted.

The glass substrate 4 is divided as described above.

First to third modifications of the dividing method will now be described.

Figure 7A:
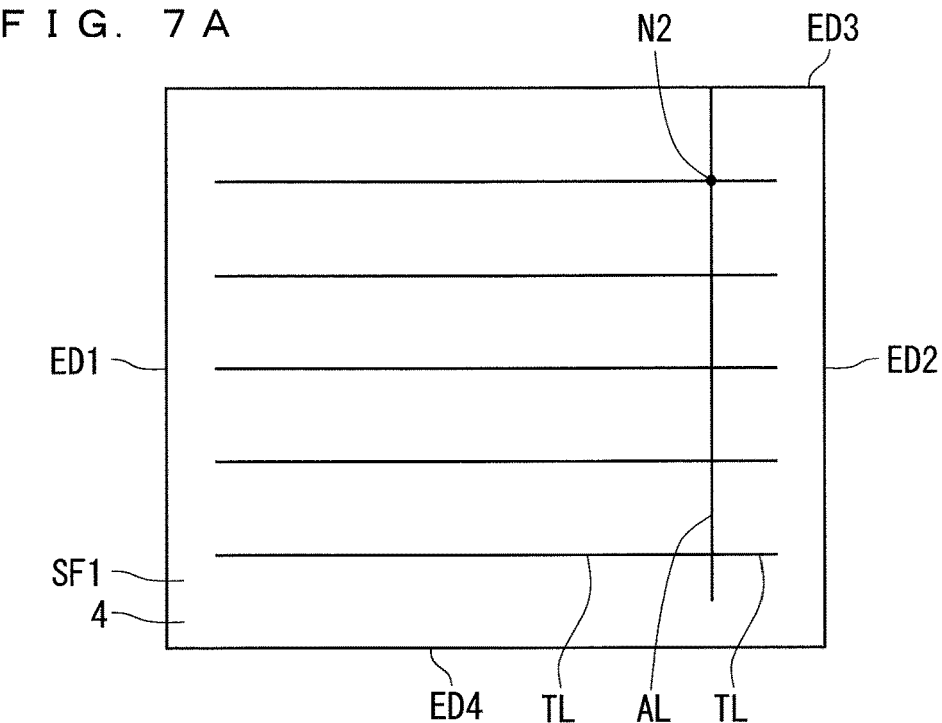
FIGS. 7A and 7B are top views schematically illustrating a method for dividing a brittle substrate in a first modification of the second embodiment of the present invention.
Figure 7B:
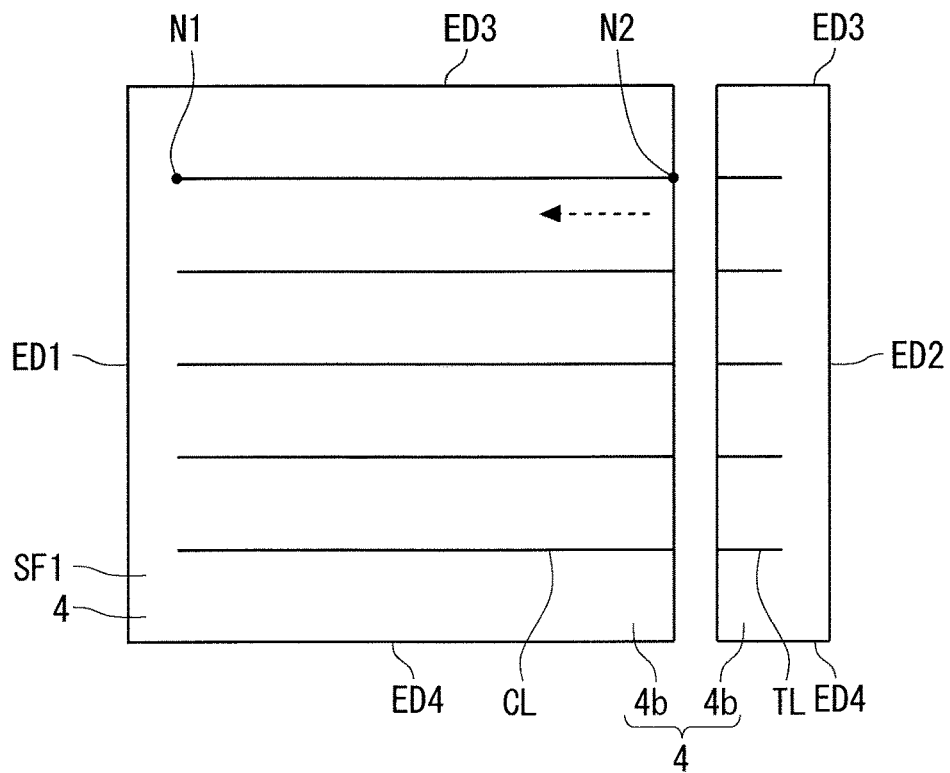

With reference to FIG. 7A, the first modification relates to the case in which the intersecting of an assist line AL and trench lines TL is not sufficient as a trigger to start the formation of crack lines CL (FIG. 6B). With reference to FIG. 7B, an external force that produces, for example, a bending moment is applied to the glass substrate 4 to extend the cracks in the thickness direction DT along the assist line AL, thus separating the glass substrate 4. The formation of crack lines CL accordingly starts.

Although the assist line AL is formed on the upper surface SF1 of the glass substrate 4 in FIG. 7A, the assist line AL for separating the glass substrate 4 may be formed on the lower surface SF2 of the glass substrate 4. In this case, the assist line AL and the trench lines TL are not in direct contact with each other though they intersect each other at the position N2 in a planar layout.

In the first modification, a distortion of an internal stress in the vicinity of the trench line TL is released by separating the glass substrate 4, so that the formation of the crack line CL starts. The assist line AL itself may thus be a crack line CL formed through application of a stress to the trench line TL.

With reference to FIG. 8, in the second modification, the cutter edge 51 is pressed against the upper surface SF1 of the glass substrate 4 at the position N3 in step S20 (FIG. 4). In the formation of trench lines TL in step S30 (FIG. 4), the cutter edge 51 is displaced from the position N3 to the position N2 and is further displaced from the position N2 to the position N1 in the present modification. With reference to FIGS. 5A and 5B, the cutter edge 51 is displaced in a direction DB that is a direction from the edge ED2 to the edge ED1. The direction DB corresponds to the direction opposite to the direction in which the axis AX extending from the cutter edge 51 is projected onto the upper surface SF1. In this case, the cutter edge 51 is pushed forward on the upper surface SF1 by the shank 52.

With reference to FIG. 9, in the third modification, during the formation of trench lines TL in step S30 (FIG. 4), the cutter edge 51 is pressed against the upper surface SF1 of the glass substrate 4 with a greater force at the position N2 than at the position N1. Specifically, the load of the cutter edge 51 is increased when the formation of the trench line TL reaches a position N4, which is a position between the positions N1 and N2. In other words, the load on the trench line TL is increased more between the positions N4 and N3, which is the end portion of the trench line TL, than at the position N1. Consequently, the formation of crack lines CL is easily induced from the position N2 while alleviating the load other than at the end portion.

The present embodiment can accordingly form a crack line CL from a trench line TL more reliably.

Unlike in the third embodiment, which will be described below, in the present embodiment, the assist line AL has yet to be formed when the trench line TL has been formed (FIG. 6A). The crack-free state can be maintained more stably without being affected by the assist line AL. In the case where the stability of the crack-free state is not an issue, the crack-free state may be maintained in the state of FIG. 7A in which the assist line AL is formed in place of the state of FIG. 6A in which no assist line AL is formed.

Third Embodiment

A method for dividing a brittle substrate in the present embodiment will be described below with reference to FIGS. 10 to 12.

Figure 10:
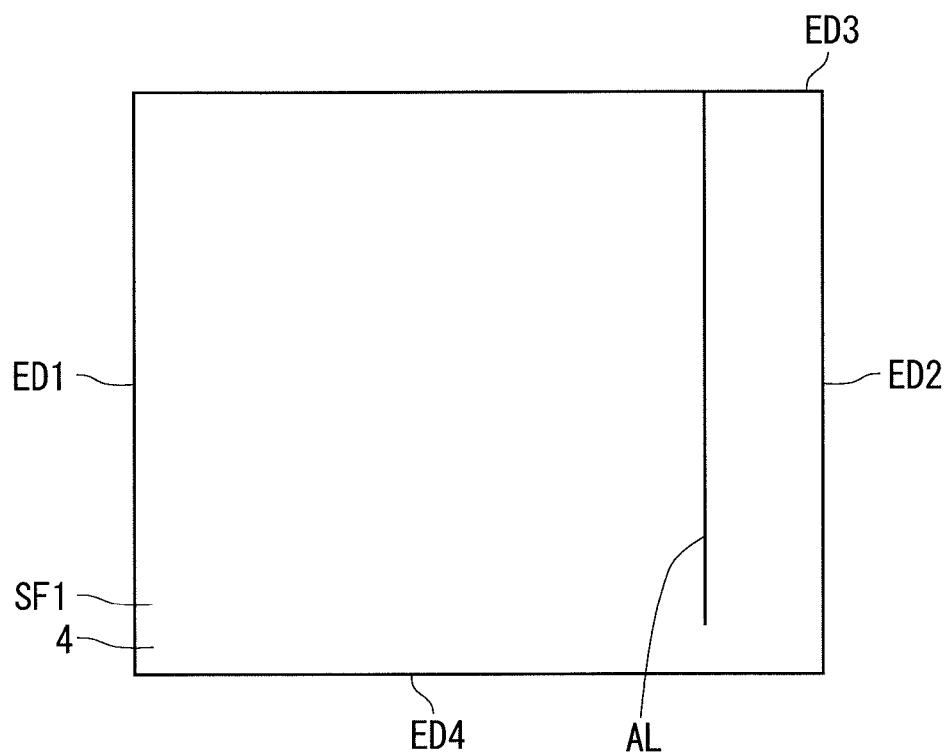
FIG. 10 is a top view schematically illustrating a first step of a method for dividing a brittle substrate in a third embodiment of the present invention.

With reference to FIG. 10, an assist line AL is formed before the formation of trench lines TL in the present embodiment. A method for forming the assist line AL per se is similar to that of FIG. 6B (second embodiment).

Figure 11:
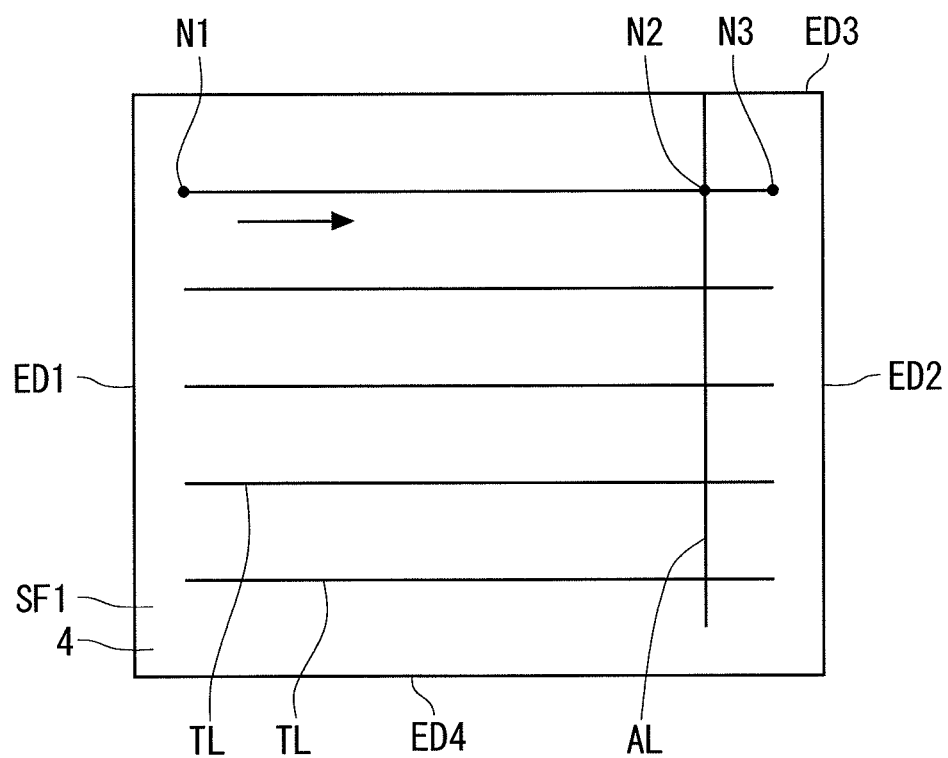
FIG. 11 is a top view schematically illustrating a second step of the method for dividing a brittle substrate in the third embodiment of the present invention.

With reference to FIG. 11, the cutter edge 51 is then pressed against the upper surface SF1 in step S20 (FIG. 4), and subsequently, trench lines TL are formed in step S30 (FIG. 4). A method for forming a trench line TL per se is similar to that of FIG. 6A (second embodiment). The assist line AL intersects the trench lines TL at the position N2. Then, step S40 (FIG. 4) is performed as in the second embodiment.

With reference to FIG. 12, the glass substrate 4 is then separated along the assist line AL in a typical breaking step of applying such an external force as to produce, for example, a bending moment to the glass substrate 4. Consequently, in step S50 (FIGS. 5A and 5B), the formation of crack lines CL similar to that of the first embodiment starts (see a dashed arrow in the figure). Although the assist line AL is formed on the upper surface SF1 of the glass substrate 4 in FIG. 10, the assist line AL for separating the glass substrate 4 may be formed on the lower surface SF2 of the glass substrate 4. In this case, the assist line AL and the trench lines TL are not in direct contact with each other though they intersect each other at the position N2 in a planar layout.

The other steps are substantially identical to those of the second embodiment described above.

Figure 13A:
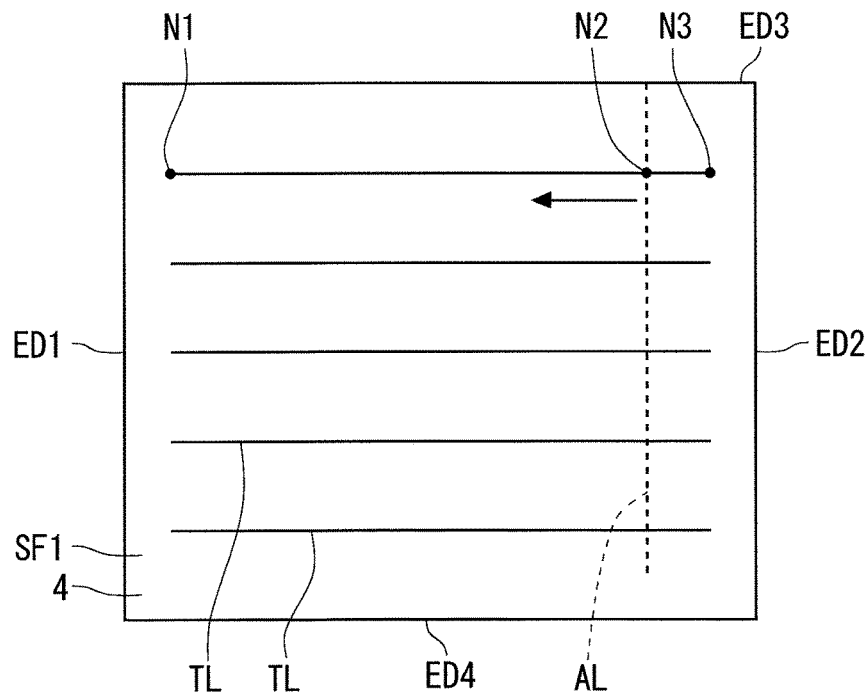
FIGS. 13A and 13B are top views schematically illustrating a method for dividing a brittle substrate in a first modification of the third embodiment of the present invention.
Figure 13B:
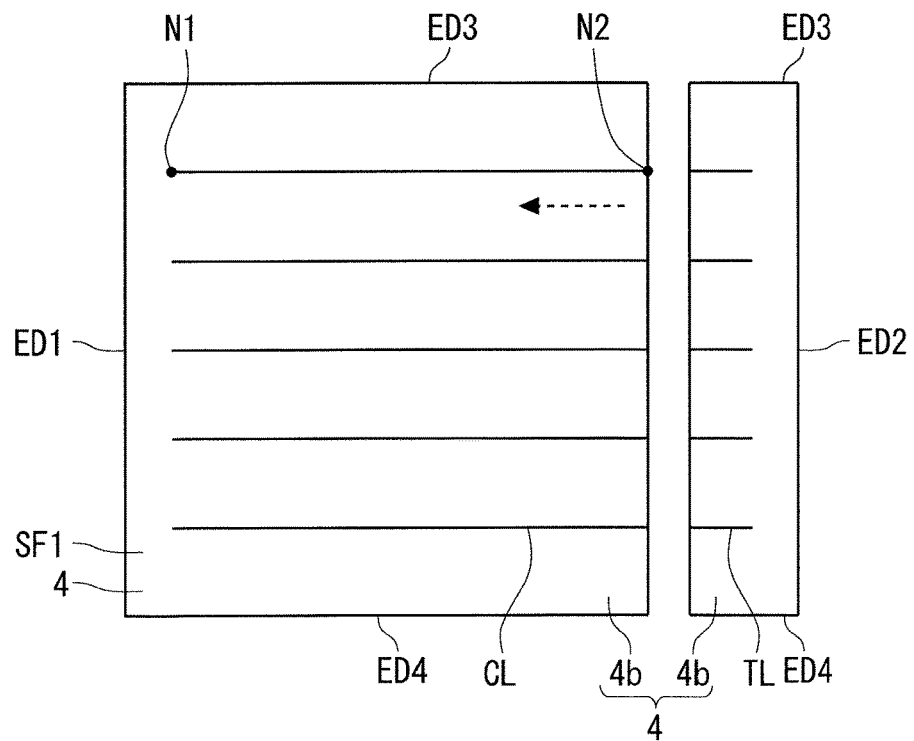

With reference to FIG. 13A, an assist line AL is formed on the lower surface SF2 of the glass substrate 4 in a first modification. Trench lines TL are then formed from the position N3 to the position N1 as in FIG. 8 (second embodiment). With reference to FIG. 13B, an external force that produces, for example, a bending moment is applied to the glass substrate 4 to separate the glass substrate 4 along the assist line AL. The formation of crack lines CL accordingly starts (see a dashed arrow in the figure).

With reference to FIG. 14, in a second modification, the cutter edge 51 is pressed against the upper surface SF1 of the glass substrate 4 with a greater force at the position N2 than at the position N1 in the formation of trench lines TL in step S30 (FIG. 4). Specifically, the load of the cutter edge 51 is increased when the formation of the trench line TL reaches the position N4, which is a position between the positions N1 and N2. In other words, the load on the trench line TL becomes higher between the positions N4 and N3, which is the end portion of the trench line TL, than at the position N1. Consequently, the formation of the crack lines CL is easily induced from the position N2 while alleviating the load other than at the end portion.

Fourth Embodiment

Figure 15A:
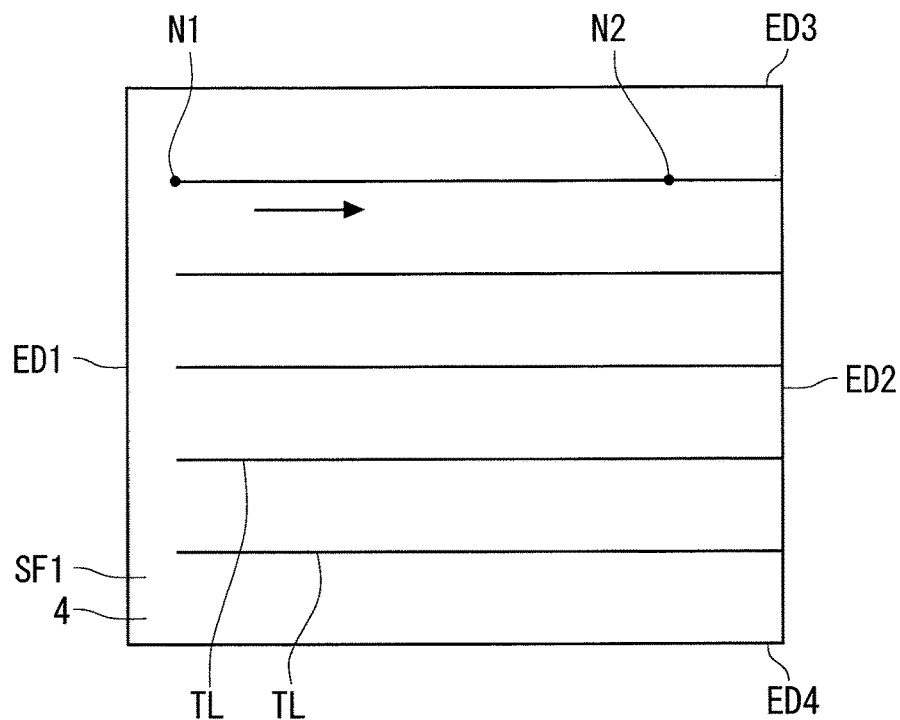
FIGS. 15A and 15B are top views schematically illustrating a method for dividing a brittle substrate in a fourth embodiment of the present invention.

With reference to FIG. 15A, in a method for dividing a brittle substrate in the present embodiment, trench lines TL extending from the position N1 via the position N2 to the edge ED2 are formed in step S30 (FIG. 4). Then, step S40 (FIG. 4) is performed as in the second embodiment.

Figure 15B:
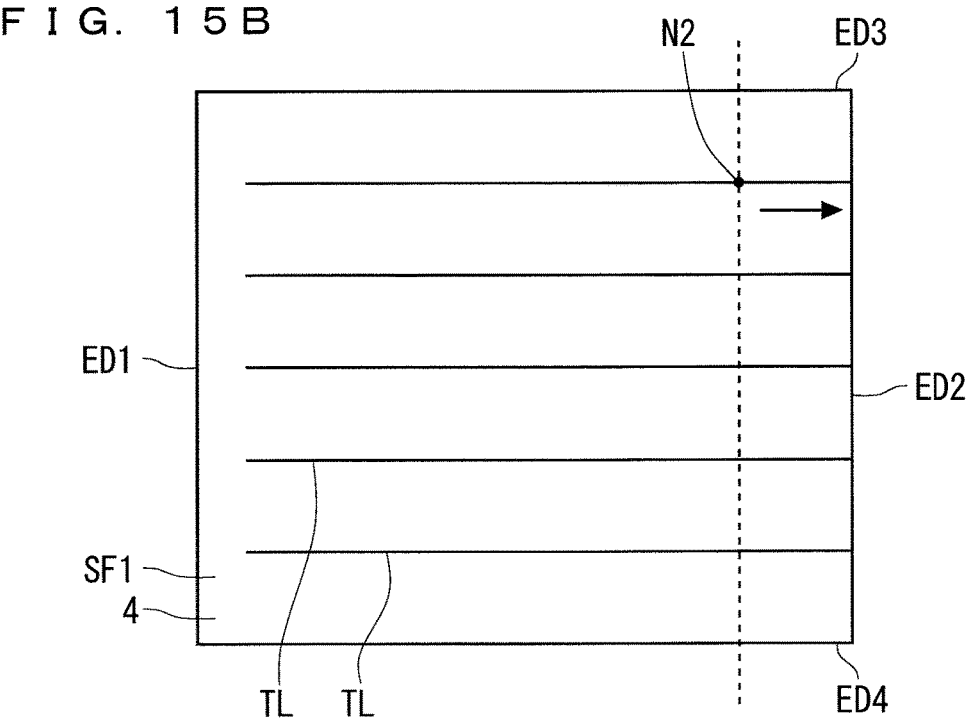

With reference to FIG. 15B, such a stress as to release a distortion of an internal force in the vicinity of the trench line TL is applied between the position N2 and the edge ED2. This induces the formation of crack lines along the trench lines TL (FIG. 4: step S50).

As the application of a stress, specifically, the pressed cutter edge 51 is caused to slide between the position N2 and the edge ED2 (in the figure, in an area between a dashed line and the edge ED2) on the upper surface SF1. This sliding is performed until the cutter edge 51 reaches the edge ED2. The cutter edge 51 is caused to slide preferably to intersect the path of the trench line TL that has been first formed, more preferably, to overlap the path of the trench line TL that has been first formed. The length of a second sliding is, for example, approximately 0.5 mm. A second sliding may be performed for each of a plurality of trench lines TL (FIG. 15A) after they are formed. Alternatively, the step of forming one trench line TL and the step of causing the cutter edge 51 to slide again may be performed in order for each trench line TL.

In a modification, to apply a stress between the position N2 and the edge ED2, laser light may be applied between the position N2 and the edge ED2 on the upper surface SF1, in place of causing the cutter edge 51 to slide again as described above. A resultant thermal stress can also release a distortion of an internal stress in the vicinity of the trench line TL. This induces the formation of crack lines.

The other steps are substantially identical to those of the second embodiment described above.

Fifth Embodiment

Figure 16A:
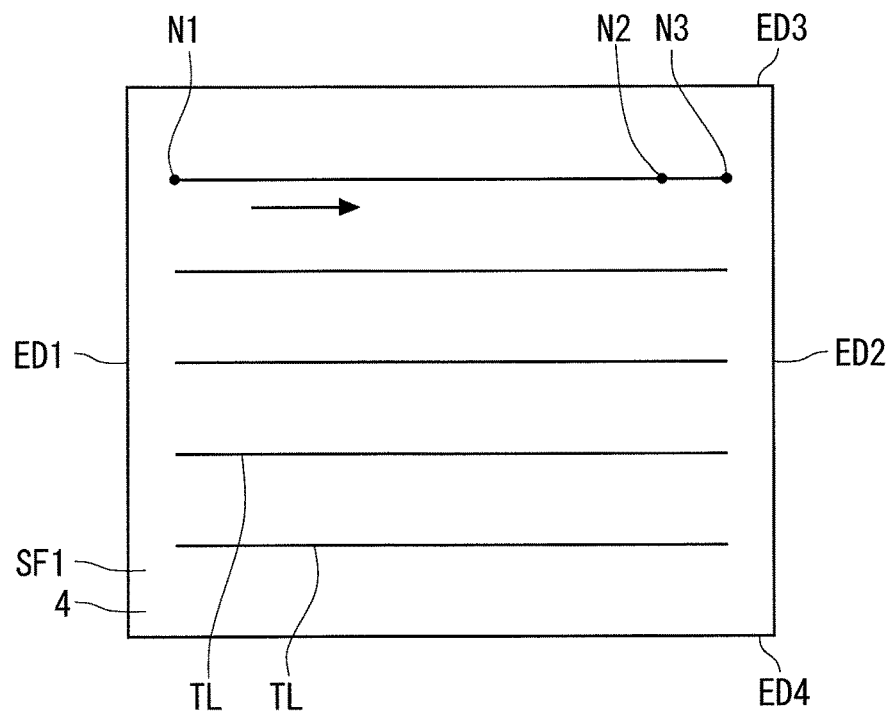
FIGS. 16A and 16B are top views schematically illustrating a method for dividing a brittle substrate in a fifth embodiment of the present invention.

With reference to FIG. 16A, in a method for dividing a brittle substrate in the present embodiment, the cutter edge 51 is displaced from the position N1 to the position N2 and to the position N3 in step S30 (FIG. 4), thus forming a trench line TL apart from the perimeter of the upper surface SF1. A method for forming trench lines TL per se is substantially identical to that of FIG. 6A (second embodiment). Then, step S40 (FIG. 4) is performed as in the second embodiment.

Figure 16B:
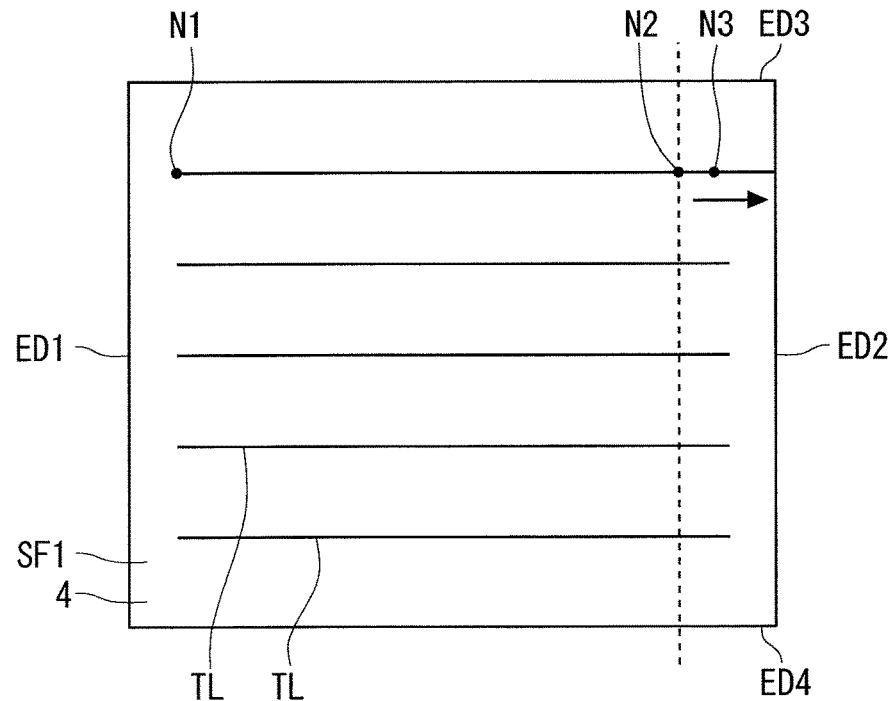

With reference to FIG. 16B, a stress is applied as in FIG. 15B (the fourth embodiment and the modification thereof). This induces the formation of crack lines along the trench lines TL (FIG. 4: step S50).

Figure 17:
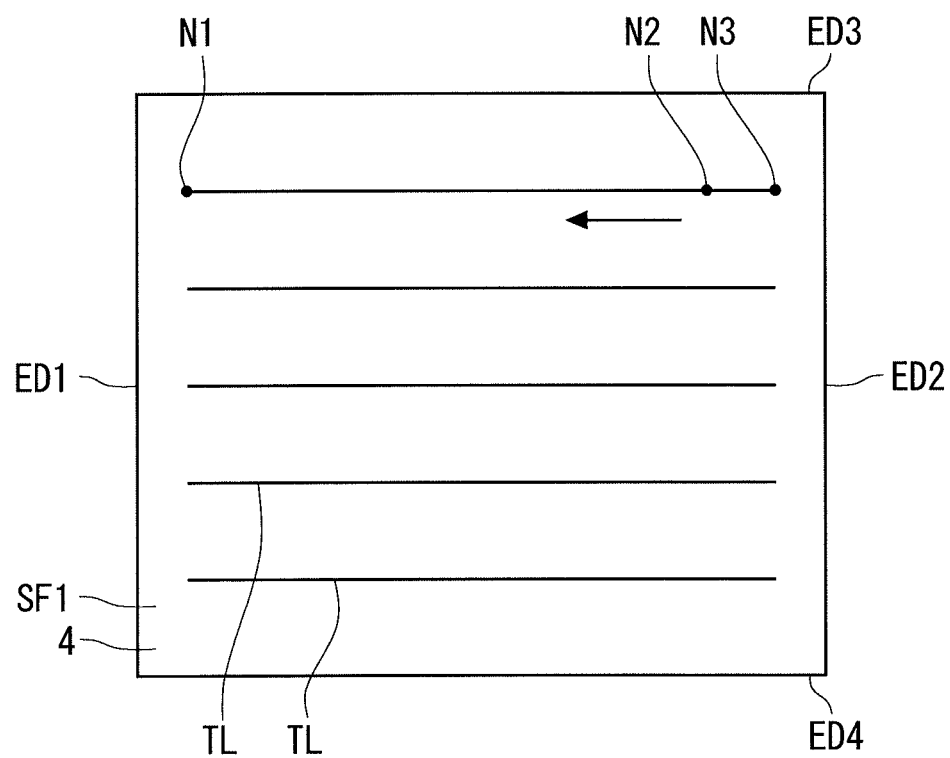
FIG. 17 is a top view schematically illustrating a method for dividing a brittle substrate in a modification of the fifth embodiment of the present invention.

With reference to FIG. 17, in a modification of the step of FIG. 16A, the cutter edge 51 may be displaced from the position N3 to the position N2 and then from the position N2 to the position N1 in the formation of trench lines TL.

The other steps are substantially identical to those of the second embodiment described above.

Sixth Embodiment

Figure 18A:
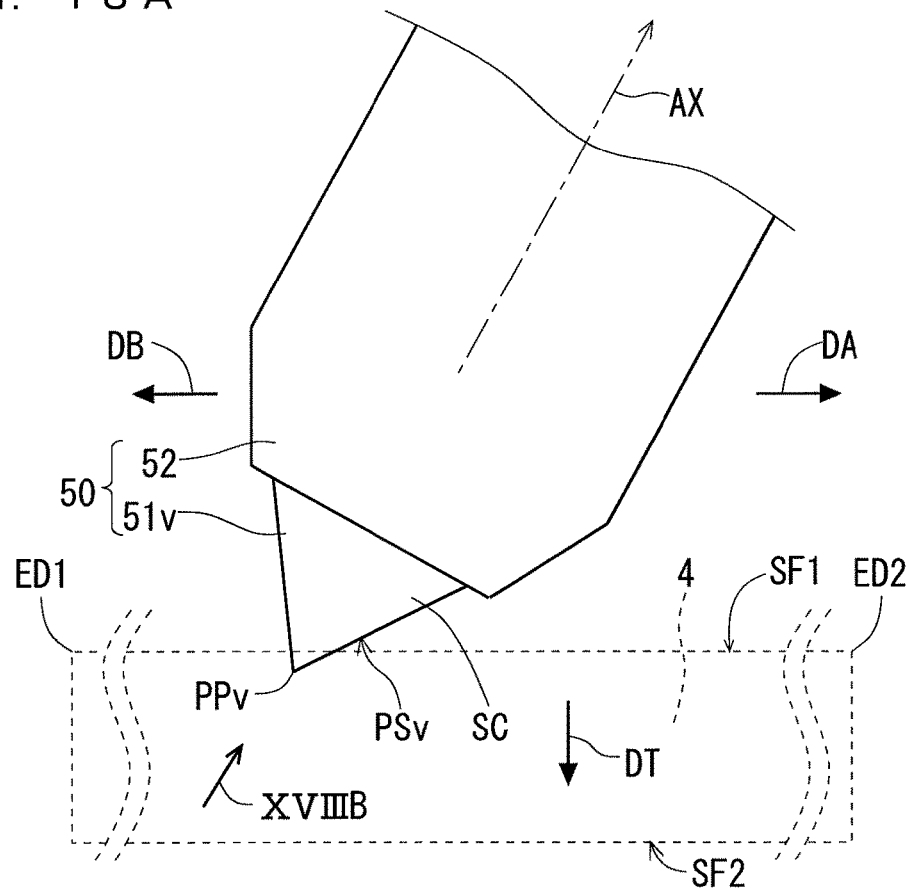
FIG. 18A is a side view schematically illustrating a configuration of a tool used in a method for dividing a brittle substrate in a sixth embodiment of the present invention.
Figure 18B:
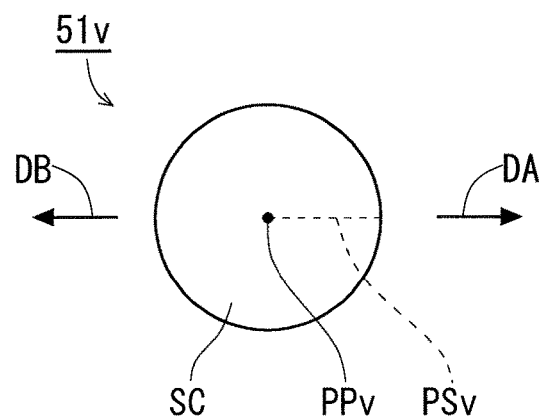
FIG. 18B is a plan view schematically illustrating a configuration of a cutter edge of the tool, which is seen from an arrow XVIIIB of FIG. 18A.

With reference to FIGS. 18A and 18B, a cutter edge 51v may be used in place of the cutter edge 51 (FIGS. 5A and 5B) in the embodiments above. The cutter edge 51v has a shape of a cone with a vertex and a conical surface SC. A protruding portion PPv of the cutter edge 51v is formed by the vertex. The side portion PSv of the cutter edge is formed along an imaginary line (a dashed line in FIG. 18B) extending from the vertex on the conical surface SC. The side portion PSv accordingly has a convex shape extending linearly.

Although the first and second edges of the perimeter of the glass substrate are short sides of a rectangle in the embodiments above, the first and second sides may be long sides of the rectangle. The shape of the perimeter is not limited to a rectangle and may be, for example, a square. The first and second edges are not limited to linear edges and may be curved edges. Although the surface of the glass substrate is flat in the embodiments above, the surface of the glass substrate may be curved.

Although a glass substrate is used as the brittle substrate especially suitable for the dividing method above, the brittle substrate is not limited to a glass substrate. The brittle substrate can be made of glass, as well as ceramic, silicon, compound semiconductor, sapphire, or quartz.

The embodiments of the present invention may be arbitrarily combined, or modified or omitted as appropriate within the scope of the present invention.

EXPLANATION OF REFERENCE SIGNS 4 glass substrate (brittle substrate)
11, 12 member
51, 51v cutter edge
AL assist line
CL crack line
ED1 edge (first edge)
ED2 edge (second edge)
N1 position (first position)
N2 position (second position)
SF1 upper surface (first surface)
SF2 lower surface (second surface)
TL trench line
PP, PPv protruding portion
PS, PSv side portion

The invention claimed is:

1. A method for dividing a brittle substrate, the method comprising:

preparing a brittle substrate including a first surface and having a thickness direction perpendicular to said first surface;

pressing a cutter edge against said first surface of said brittle substrate;

forming a trench line having a groove shape by causing said cutter edge pressed in said pressing step to slide on said first surface of said brittle substrate to generate a plastic deformation on said first surface of said brittle substrate, said step of forming a trench line being performed to obtain a crack-free state in which said brittle substrate retains seamless continuity in a direction crossing said trench line, directly below said trench line, and along said trench line;

maintaining said crack-free state after said forming a trench line;

after said step of maintaining said crack-free state, forming a crack line in said thickness direction and along said trench line, said crack line breaking said seamless continuity of said brittle substrate in the direction crossing said trench line, directly below said trench line, and along said trench line; and dividing said brittle substrate along said crack line.

2. The method for dividing a brittle substrate according to claim 1, wherein said maintaining said crack-free state comprises transporting said brittle substrate.

3. The method for dividing a brittle substrate according to claim 1, wherein said maintaining said crack-free state comprises processing said brittle substrate.

4. The method for dividing a brittle substrate according to claim 3, wherein
in said preparing a brittle substrate, said brittle substrate includes a second surface opposite to said first surface, and
said processing said brittle substrate comprises providing a member on at least any one of said first and second surfaces.

5. The method for dividing a brittle substrate according to claim 1, wherein in said preparing a brittle substrate, said brittle substrate comprises glass.

6. The method for dividing a brittle substrate according to claim 1, wherein
in said step of preparing a brittle substrate, said first surface is surrounded by a perimeter including first and second edges opposite to each other,
in said step of pressing a cutter edge, said cutter edge includes a protruding portion and a side portion which is a ridge linearly extending from said protruding portion, said pressing a cutter edge being performed such that said side portion of said cutter edge is positioned between said protruding portion and said second edge on said first surface of said brittle substrate,
in said step of forming a trench line, said trench line is formed between a first position and a second position that is closer to said second edge than said first position is to said second edge, and
said step of forming a crack line is performed by extending the crack of said brittle substrate in said thickness direction from said second position to said first position along said trench line.

7. The method for dividing a brittle substrate according to claim 1, wherein, in said crack-free state, no crack is formed along said trench line.

* * * * *